US007452562B2

(12) United States Patent
Fukaya et al.

(10) Patent No.: US 7,452,562 B2
(45) Date of Patent: Nov. 18, 2008

(54) METHOD OF PRODUCING STERILIZED PACKED PASTA

(75) Inventors: Tetsuya Fukaya, Nasu-gun (JP); Chizu Oshima, Nasu-gun (JP); Kendou Yoshihara, Shibata (JP); Kinya Sakuma, Shibata (JP); Kenei Takahashi, Shibata (JP)

(73) Assignee: Kagome Kabushiki Kaisha, Nagoya (JP)

( * ) Notice: Subject to any disclaimer, the term of this patent is extended or adjusted under 35 U.S.C. 154(b) by 720 days.

(21) Appl. No.: 10/680,867

(22) Filed: Oct. 6, 2003

(65) Prior Publication Data

US 2004/0131742 A1 Jul. 8, 2004

(30) Foreign Application Priority Data

Oct. 9, 2002 (JP) ............................ 2002-295943

(51) Int. Cl.
*A23L 1/162* (2006.01)

(52) U.S. Cl. ....................... 426/557; 426/392; 426/412; 426/451; 426/521

(58) Field of Classification Search ....................... None
See application file for complete search history.

(56) References Cited

U.S. PATENT DOCUMENTS

| | | | | |
|---|---|---|---|---|
| 4,466,985 | A * | 8/1984 | Tsen et al. | 426/131 |
| 4,734,291 | A * | 3/1988 | Raffensperger | 426/325 |
| 5,332,587 | A * | 7/1994 | Howard et al. | 426/128 |
| 5,702,745 | A * | 12/1997 | Yang et al. | 426/242 |
| 5,786,009 | A * | 7/1998 | Goto et al. | 426/106 |
| 5,916,620 | A * | 6/1999 | Oh | 426/557 |
| 6,017,572 | A * | 1/2000 | Meyer | 426/521 |

* cited by examiner

*Primary Examiner*—Lien Tran
(74) *Attorney, Agent, or Firm*—Weaver Austin Villeneuve & Sampson LLP

(57) ABSTRACT

Sterilized packed pasta is produced by filling a container with pasta and water, boiling the pasta in the container inside a retort at Fo value of 0.1-1.5 while repeatedly increasing pressure inside the retort and releasing pressure inside the retort so as to cause the water to be evaporated, and thereafter sealing the container inside a clean booth.

7 Claims, 1 Drawing Sheet

METHOD OF PRODUCING STERILIZED PACKED PASTA

BACKGROUND OF THE INVENTION

This invention relates to a method of producing sterilized packed pasta, as well as sterilized packed pasta thus produced.

Cooked rice and boiled pasta are widely consumed. It would be convenient if sterilized packed pasta produced by sealing boiled pasta in a germ-free manner in individual trays of a plastic material were available, such as sterilized cooked rice. It now goes without saying that such sterilized packed pasta must retain the taste and flavor expected of the original boiled pasta packed in a container. The present invention relates to a method for producing such sterilized packed pasta.

Sterilized cooked rice in a packed form has been known. It is produced by filling a container with rice and water, boiling the rice inside the container in a retort and thereafter sealing the container inside a clean booth. Sterilized packed pasta, on the other hand, has not been known. If it were attempted to produce sterilized packed pasta in the same way as sterilized packed rice is produced as described above, the result would be something totally unattractive. Whether it is rice or pasta that is being cooked, an appropriate amount within a narrowly defined range of water must be used for boiling with respect to any given quantity of rice or pasta in order to obtain a product al dente. During the boiling process, rice remains totally immersed inside the boiling water and hence becomes uniformly boiled but pasta, due to its small specific weight, does not remain immersed in the water. The portions of the pasta floating above the water are not boiled properly and specks tend to appear on the boiled pasta. In other words, speckled pasta is obtained by the boiling, depending on the position of the pasta inside the container.

SUMMARY OF THE INVENTION

It is therefore an object of this invention to provide a method of producing sterilized packed pasta that is free of specks (of the kind depending on the position inside the container) after being boiled, retaining the flavor and taste of the original pasta and, capable of preventing its putrefaction over days, as well as sterilized packed pasta thus produced.

A method of this invention for producing sterilized packed pasta may be characterized as comprising the steps of filling a container with pasta and water, boiling the pasta in the container inside a retort at Fo value of 0.1-1.5 (hereinafter expressed as Fo=0.1-1.5) while repeatedly increasing pressure inside the retort and releasing pressure inside the retort under conditions wherein the water is evaporated, and thereafter sealing the container inside a clean booth.

Explained more in detail, a container such as a heat-resistant plastic container is filled with pasta and water and this pasta is boiled at Fo=0.1-1.5 inside a retort, without taking the pasta out of the container. Throughout herein the expression "to boil" is used in its broadest sense as "to cook by boiling." According to this invention, the pasta is usually cooked by pressurized heated steam, that is, pressurized heated steam is supplied into the retort so as to generate a pressurized heated atmosphere inside the retort. If the pasta were simply boiled in this fashion, however, some of the pasta would remain in a floating condition above the boiling water because pasta, unlike rice, is relatively light and the portions of the pasta above the water line would not be boiled sufficiently. As a result, the boiled pasta would be speckled, depending on the position in the container.

In order to prevent such specks from appearing on the pasta, the boiling of the pasta is effected according to this invention while the process of increasing the pressure inside the retort and the process of releasing the pressure inside the report under the conditions wherein the water is caused to evaporate are cyclically repeated. If pressurized heated steam is supplied into the retort to boil the pasta in the pressurized and heated atmosphere thus generated and then the pressurized heated steam is released out of the retort, the water boils up and is evaporated and the foamed portion thus generated covers the floating portion of the pasta above the water level, boiling also the floating portions of the pasta above the water level. The method according to this invention is characterized by this step of cyclically repeating the process of increasing the pressure inside the retort and the process of releasing this pressure such that the pasta as a whole can be evenly boiled such that no specks or spots are formed.

That the Fo value should be 0.1-1.5 at the time of the boiling is a condition essentially for obtaining germ-free sterilized boiled pasta, or pasta with a satisfactory shelf life such that it will not spoil for days. It is preferable, therefore, that the boiling be carried out under the condition of Fo=0.3-0.9. According to this invention, the pasta, thus boiled, is transferred together with the container into a clean booth to therein have the container sealed, say, by covering the container with a film and sealing it thermally.

Before the pasta is boiled, it is preferable to preliminarily sterilize its surface with steam or by means of a heater. The pasta may thus be preliminarily sterilized first and then put inside a container together with water but it is preferable to fill the container with pasta first, to sterilize its surface and then to add water into the container. In both methods, it is preferable to preliminarily sterilize the surface of the pasta at Fo=0.1-15. The water to be used may be salt water with salt concentration of 0.5 weight %. It is also preferable to use water adjusted to pH 2.5-4.2 by using organic acid such as citric acid and gluconic acid.

Even if the pasta is not preliminarily sterilized and water or salt water not having its pH value adjusted is used, it is possible by the method of this invention to obtain sterilized packed pasta without specks or spots depending on the position in the container, having the taste and flavor of the original pasta and having a satisfactory shelf life. In order to produce pasta in still better conditions, however, it is preferable to carry out a preliminary sterilization process and to use water with pH value adjusted. In order to further improve the shelf life, in particular, it is preferable to fill the container with pasta and to fill the container with water having its pH value adjusted after the surface of the pasta is preliminarily sterilized at Fo value of 8.0-15. It is particularly preferable to fill the container with pasta and to fill the container with water having its pH value adjusted to 2.5-4.2 after the surface of the pasta is preliminarily sterilized at Fo value of 0.1-6.0.

As explained above, pasta is boiled inside a retort according to this invention while the process of increasing the pressure inside the retort and the process of releasing this pressure are cyclically repeated. It is preferable to carry out this cyclical operation at a rate of 1-4 cycles per minute. It is also preferable to carry out this operation such that the temperature inside the retort is 105±3° C. after the pressure inside is increased, that it is 102±2° C. after the inside pressure is released, and that the difference in the inside temperature between these times is 2-8° C. It is further preferable to carry out this operation of cyclically repeating the increasing and releasing of the inside pressure such that the pressure is increased to a higher level of 0.13±0.02 MPa and is released down to a lower level of 0.11±0.02 MPa such that the difference therebetween is 0.01-0.05 MPa.

According to this invention, the container is sealed inside a clean booth after the pasta is boiled as explained above but it is preferable to further steam the container after it is sealed by inverting or rotating this container. It is further preferable to carry out this steaming process at 65-100° C. for 5-25 minutes. By such a method, it is possible to obtain sterilized packed pasta without specks, and in particular specks depending on the position of the pasta inside the container, having the original taste and flavor of the pasta and having a favorable shelf life.

Sterilized packed pasta according to this invention is characterized as being obtained by a method of this invention as characterized above.

DETAILED DESCRIPTION OF THE INVENTION

The invention is described next by way of an example with reference to drawings.

Figure 1:
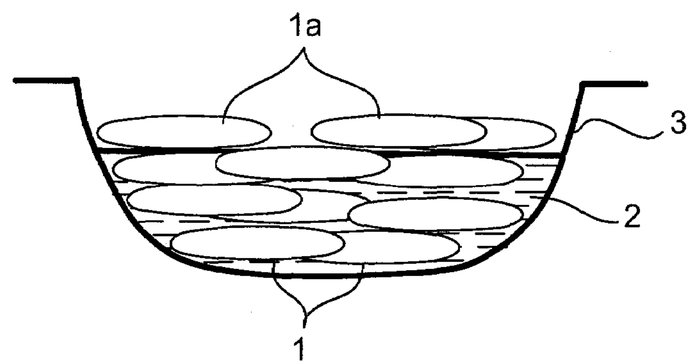
FIG. 1 is a vertical sectional view that schematically shows a container filled with pasta and water in a method embodying this invention.

As shown in FIG. 1, pasta 1 and water for boiling 2 are placed inside a container 3 as a first step of a method embodying this invention. Since the pasta 1 has a small specific weight, it does not sink inside the water 2, some of the pasta (as indicated by symbol 1*a*) being afloat above the water 2.

Figure 2:
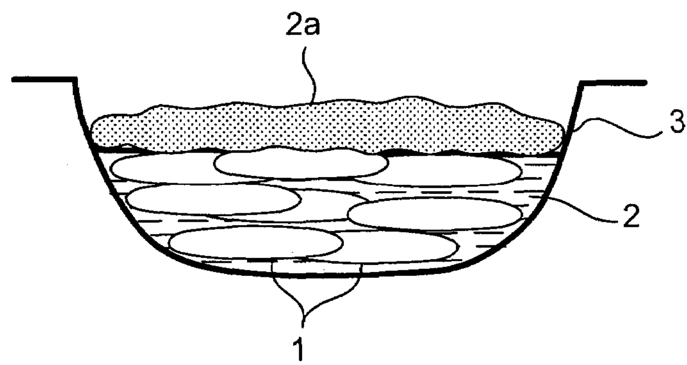
FIG. 2 is a vertical sectional view that schematically shows the method of this invention at a pressure-releasing time.

According to a method of this invention, the pasta 1 is boiled together with the container 3 at Fo value within the range of 0.1-1.5 inside a retort (not shown). This boiling process is carried out while pressure is repeatedly increased and released under a condition for allowing the water 2 to boil. Pressurized and heated steam is supplied into the retort in order to provide a pressurized and heated atmosphere inside the retort to boil the pasta 1. Next, the pressurized and heated steam inside the retort is released therefrom so as to reduce the pressure inside the retort. As a result, the water 2 boils and generates a foamed portion 2*a* that covers the floating pasta 1*a* above the water 2, as shown in FIG. 2. Thus, the floating pasta 1*a*, too, becomes boiled under this condition. According to this invention, the aforementioned steps of pressurizing the steam (or increasing the pressure of the steam inside the retort) and reducing the pressure are cyclically repeated to boil the pasta 1.

Figure 3:
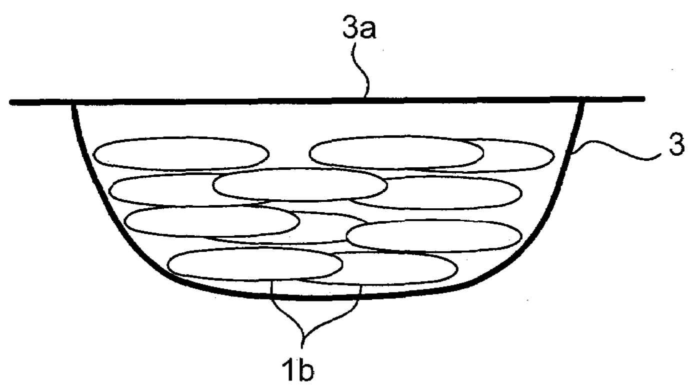
FIG. 3 is a vertical sectional view that schematically shows sterilized packed pasta produced by the method of this invention.

The boiled pasta 1*b* is finally removed out of the retort together with the container 3 and placed inside a clean booth (not shown). Temperature is reduced to a specified level inside this clean booth and the container 3 is thereafter thermally sealed with a film 3*a*, as shown in FIG. 3.

The invention is described next by way of test examples.

Part 1 (Production of Sterilized Packed Pasta)

TEST EXAMPLE 1

A heat-resistant plastic tray for an individual portion was filled with dried short pasta ("penne"). After its surface was preliminarily sterilized with steam at Fo value of 10, 0.5-weight % salt water with pH value not adjusted was added into the tray as boiling water at the weight ratio of 1/1 with respect to the pasta. The tray was then set inside a retort and the pasta was boiled therein for 20 minutes together with the tray up to the Fo value of 0.5. During this time, the process of supplying pressurized heated steam into the retort and thereby generating a pressurized heated atmosphere inside the retort and the process of releasing the pressurized heated steam inside the retort to the exterior and thereby reducing the atmospheric pressure inside the retort and causing the salt water to boil such that the foamed portion generated by the boiling covers the portion of the pasta floating above the salt water were cyclically repeated at the rate of three cycles per minute. After each process of supplying pressurized steam, the atmospheric temperature and the pressure inside the retort were 105° C. and 0.13 MPa, respectively. After each process of releasing the steam, they were 102° C. and 0.11 MPa, respectively. At the end of the boiling process, the temperature of the pasta as product was 105° C. Finally, the pressure was reduced to the normal level and the tray was removed from the retort into a clean booth of Class 100 (according to the NASA (USA)) wherein the temperature of the pasta was reduced to 80° C. and thereafter the tray was covered with a plastic film and thermally sealed to thereby obtain sterilized packed pasta of Test Example 1.

TEST EXAMPLE 2

Sterilized packed pasta of Test Example 2 was produced in the same way as in Test Example 1 except that the surface of the dried short pasta filling an individual tray was not preliminarily sterilized and that 0.5-weight % salt water with pH value adjusted to 3.5 with gluconic acid was used as boiling water.

TEST EXAMPLE 3

Sterilized packed pasta of Test Example 3 was produced in the same way as in Test Example 1 except that the surface of the dried short pasta filling an individual tray was preliminarily sterilized with steam at Fo value of 2.0 and that 0.5-weight % salt water with pH value adjusted to 3.5 with gluconic acid was used as boiling water.

TEST EXAMPLE 4

Sterilized packed pasta of Test Example 4 was produced in the same way as in Test Example 1 except that 0.5-weight % salt water with pH value adjusted to 3.5 with gluconic acid was used as boiling water.

TEST EXAMPLE 5

Sterilized packed pasta of Test Example 5 was produced in the same way as in Test Example 1 except that the surface of the dried short pasta filling an individual tray was not preliminarily sterilized, that 0.5-weight % salt water with pH value adjusted to 3.5 with gluconic acid was used as boiling water, and that the individual tray was inverted after it was covered with a plastic film and thermally sealed and it was steamed at 90° C. for ten minutes.

TEST EXAMPLE 6

Sterilized packed pasta of Test Example 6 was produced in the same way as in Test Example 1 except that the individual tray was inverted after it was covered with a plastic film and thermally sealed and it was steamed at 90° C. for ten minutes.

TEST EXAMPLE 7

Sterilized packed pasta of Test Example 7 was produced in the same way as in Test Example 1 except that the surface of the dried short pasta filling an individual tray was preliminarily sterilized with steam at Fo value of 2.0, that 0.5-weight % salt water with pH value adjusted to 3.5 with gluconic acid was used as boiling water, and that the individual tray was inverted after it was covered with a plastic film and thermally sealed and it was steamed at 90° C. for ten minutes.

TEST EXAMPLE 8

Sterilized packed pasta of Test Example 8 was produced in the same way as in Test Example 1 except that 0.5-weight % salt water with pH value adjusted to 3.5 with gluconic acid was used as boiling water, and that the individual tray was inverted after it was covered with a plastic film and thermally sealed and it was steamed at 90° C. for ten minutes.

COMPARISON EXAMPLE 1

Sterilized packed pasta of Comparison Example 1 was produced in the same way as in Test Example 1 except that the surface of the dried short pasta filling an individual tray was not preliminarily sterilized and that the boiling process was carried out not by repeating the processes of supplying pressurized steam and releasing the pressurized steam but only by supplying pressurized steam, that is, by supplying pressurized steam into the retort and leaving the pressurized heated atmosphere inside the retort.

The production conditions described above are summarized in Table 1 below.

TABLE 1

| | Preliminary Sterilization | | Adjustment of pH of salt water | Inversion and steaming at 90° C. for 10 |
|---|---|---|---|---|
| | Fo = 2 | Fo = 10 | to 3.5 | minutes |
| Text Examples | | | | |
| 1 | − | + | − | − |
| 2 | − | − | + | − |
| 3 | + | − | + | − |
| 4 | − | + | + | − |
| 5 | − | − | + | + |
| 6 | − | + | − | + |
| 7 | + | − | + | + |
| 8 | − | + | + | + |
| Comparison Example | | | | |
| 1 | − | − | − | − |

In Table, + indicates what is done and − indicates what is not done.

Part 2 (Evaluation of Sterilized Packed Pasta Produced)

One hundred samples of each Example in Part 1 were produced and each was evaluated regarding water content, sensory perception and shelf life (keeping quality). The results of these evaluations are summarized in Table 2 below.

The water content was evaluated by measuring the water content in an upper portion and in a lower portion of the boiled pasta in the tray by using 20 of the samples of each Example and the average was obtained.

For the evaluation of sensory perception, five samples of each Test Example and 40 samples (5 samples for each of the eight Test Examples) of Comparison Example 1 were used. A comparison was made between each of Test Examples and Comparison Example 1. Ten male testers and ten female testers were asked which was preferable and the results of these comparisons were cumulatively added (total of 100 testers) for the purpose of the comparison. The numbers in Table 2 each indicate the number of testers who selected the pasta of corresponding Test Example as preferable, "*" indicates the level of significance 5%, "" indicates the level of significance 1% and "*" indicates the level of significance 0.1%.

For the evaluation of the shelf life, 40 samples of each Example were kept for 14 days in an environment of 35° C. and the presence or absence of generation of gas and growth of microorganisms was checked by visual examination. Only if both the generation of a gas and the growth of microorganisms were found to be absent, it was recorded "OK" in Table 2.

TABLE 2

| | Water content (weight %) | | | | |
|---|---|---|---|---|---|
| | Upper portion | Lower portion | Difference | Sensory perception | Shelf life |
| Text Examples | | | | | |
| 1 | 57.4 | 65.5 | 8.1 | 61** | OK |
| 2 | 57.6 | 65.6 | 8.0 | 63** | OK |
| 3 | 57.2 | 65.1 | 7.9 | 62** | OK |
| 4 | 57.3 | 64.8 | 7.5 | 60* | OK |
| 5 | 59.4 | 62.8 | 3.4 | 99*** | OK |
| 6 | 59.9 | 62.3 | 2.4 | 90*** | OK |
| 7 | 59.9 | 62.1 | 2.2 | 96*** | OK |
| 8 | 59.5 | 62.4 | 2.9 | 83*** | OK |
| Comparison Example | | | | | |
| 1 | 40.5 | 70.3 | 29.8 | — | OK |

Table 2 clearly shows that the present invention provides sterilized packed pasta which has no specks (depending on the position inside the container) after being boiled, retains the original taste and flavor of the pasta, and can be stored for a long time without being spoiled.

What is claimed is:

1. A method of producing sterilized packed pasta while preventing specks from appearing thereon, said method comprising the steps of:

filling a container with pasta and water;

boiling said pasta in said container inside a retort at Fo value of 0.1-1.5 while repeatedly increasing pressure inside said retort and releasing pressure inside said retort under conditions wherein said water is evaporated and a foamed portion of said water covers floating portion of said pasta, wherein the pressure inside said retort is increased to a higher level of 0.13±0.02 MPa and is released down to a lower level of 0.11±0.02 MPa, and wherein said higher level and said lower level are different by 0.01-0.05 MPa; and thereafter sealing said container inside a clean booth;

wherein said steps of increasing and releasing pressure inside said retort are repeated at a rate of 1-4 cycles per minute; and wherein said steps of increasing and releasing pressure inside said retort are carried out such that temperature inside said retort is 105±3° C. after said pressure is increased and 102±2° C. after said pressure is released and that temperatures in said retort after said pressure is repeatedly increased and released are different by 2-8° C.

2. The method of claim 1 wherein the step of filling comprises the steps of preliminarily sterilizing surface of said pasta and filling said container with the preliminarily sterilized pasta and water.

3. The method of claim 1 wherein the step of filling comprises the steps of placing said pasta inside said container, preliminarily sterilizing surface of said pasta and thereafter filling said container with water.

4. The method of claim 1 wherein said water is adjusted to pH 2.5-4.2.

5. The method of claim 3 wherein the step of filling comprises the steps of preliminarily sterilizing surface of said pasta at Fo=0.1-6.0 and using water adjusted to pH 2.5-4.2.

6. The method of claim 1 wherein said pasta is dry pasta and said container is filled with said dry pasta and said water at weight ratio of 1/0.9-1/1.5.

7. The method of claim 1 further comprising the step of steaming said container after said container is sealed.

* * * * *